United States Patent Office 3,218,310
Patented Nov. 16, 1965

---

3,218,310
PYRIMIDINE AZO DYESTUFFS
Jakob Benz, Oberwil, Basel-Land, and Hans Ischer, Basel, Switzerland, assignors to Sandoz Ltd. (also known as Sandoz A.G.), Basel, Switzerland
No Drawing. Filed Nov. 28, 1962, Ser. No. 240,723
Claims priority, application Switzerland, Nov. 6, 1958, 65,868/58
13 Claims. (Cl. 260—154)

The present application is a continuation-in-part of our application Ser. No. 776,208, filed November 25, 1958 (abandoned since the filing of the present application) and relates to water-soluble azo dyestuffs of the formula (dehalopyrimidyl-X)$_n$——(water-soluble azo dyestuff radical)

wherein each halogen of the dihalopyrimidyl has an atomic number from 17 to 35, i.e. is chlorine or bromine; X is an —O— containing bridge, the —O— being directly bonded to a ring carbon atom of the dihalopyrimidyl group in one of the positions 2, 4, and 6 and also bonded to the azo dyestuff radical; and $n$ is whole positive number of at most 2, the dihalopyrimidyl-X— group being a fiber-reactive grouping, i.e. a grouping which enables the dyestuff to become chemically bound to the fiber. The dyestuffs of the present invention can also be represented by the formula $$\text{Dye} \left[ \left( -O- \underset{-C=N}{\underset{\|}{N}} \overset{\text{hal}}{\underset{\|}{C}} \underset{C-}{\overset{\|}{C-H}} \right) \right]_n \text{hal} \quad (I)$$

wherein hal stands for a halogen atom with an atomic number from 17 to 35, i.e. chlorine or bromine,
Dye stands for the radical of a water-soluble organic azo dyestuff and $n$ for one of the integers 1 and 2, and wherein —O— is attached to an aromatic radical or to an aliphatic bridge member of the dye radical and occupies in relation to an azo bridge a position other than the ortho-position.

Especially valuable dyestuffs are those belonging to the monoazo series, to the disazo series and to the trisazo series. The azo dyestuffs can contain coordinatively combined metal atoms, e.g. chromium, cobalt, copper or nickel or metallizable groupings, e.g. —OH, —COOH, —O-alkyl or optionally monosubstituted amino groups, which can be converted into metal complexes by the known methods either on the fiber or in substance.
The azo dyestuffs may be of different types:

I. In the case of monoazo dyestuffs, e.g.

aryl-N=N—⟨ ⟩—O-dihalopyrimidyl (II)
   $R_1$ aryl-N=N—⟨ ⟩—N(R$_2$)-alkylene-O-dihalopyrimidyl (III)
   $R_1$ aryl-N=N—⟨⟨ ⟩⟩—O-dihalopyrimidyl
         $R_3$—NH
         (SO$_3$H)$_{1-2}$ (IV)

HO
aryl-N=N—C—N-arylene-O-dihalopyrimidyl
         $\|$
         C=N
         $|$
         R$_4$    (V)

HO
aryl-N=N—⟨⟨ ⟩⟩—Z-alkylene-O-dihalopyrimidyl
         (SO$_3$H)$_{1-2}$ (VI)

in these Formulae II to VI aryl represents a benzene or diphenyl radical bearing 1 to 2 sulfonic acid groups or a naphthalene radical bearing 1 to 3 sulfonic acid groups, arylene represents an optionally substituted phenylene or naphthylene radical, Alkylene represents —CH$_2$—CH$_2$—, $$-CH_2-\underset{CH_3}{\overset{|}{C}H}-, \quad -\underset{CH_3}{\overset{|}{C}H}-CH_2-$$

—CH$_2$—CH$_2$—CH$_2$—, —CH$_2$—CH$_2$—CH$_2$—CH$_2$—;
alkoxy, e.g. methoxy, or lower alkanoylamino, e.g. acetylamino, R$_2$ represents a lower alkyl radical which may be substituted by —OH, —O-lower alkyl, —O—CO-lower alkyl etc.

R$_3$ represents hydrogen, lower alkyl or optionally substituted phenyl, e.g. phenyl or 2′,4′,6′-trimethylphenyl, R$_4$ represents —CH$_3$—, —COOH, —COO alkyl, —CO—NH$_2$ etc.

Z represents a bridge member e.g. —NH—, —NH—CO—, —NH—COO—, —NH—SO$_2$—, —NH—CO—NH—;

further dihalopyrimidyl-O—⟨ ⟩—N=N-coupling component (VII)

dihalopyrimidyl-O-alkylene-Y—⟨ ⟩—N=N-coupling component (VIII)

dihalopyrimidyl-O—⟨⟨ ⟩⟩—N=N-coupling component
         (SO$_3$H)$_{1-2}$ (IX)

in these Formulae VII to IX.

Alkylene represents —CH$_2$—CH$_2$—CH$_2$—, $$-CH_2-\underset{CH_3}{\overset{|}{C}H}-, \quad -\underset{CH_3}{\overset{|}{C}H}-CH_2-$$

Y represents —O—, —NH—, —OS$_2$—, —CO—, —CO—NH—, —SO$_2$—NH—, —SO$_2$—N (lower alkyl)—, —NH—COO—, —NH—CO—NH—, —N—(lower alkyl)—, —N—(phenyl)—, —N—(COO-lower alkyl)— the phenyl nucleus in Formulae VII and VIII may be further substituted e.g. by lower alkyl, halogen or —SO$_3$H, and "coupling component" represents the radical of any desired coupling component, the only restriction being that the coupling component must contain a water-solubilizing group when the benzene radical is free from water-solubilizing group;

Suitable radicals of coupling components are e.g.

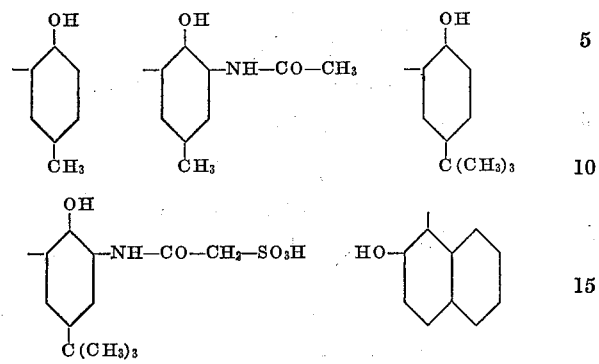

and its derivatives bearing sulfonic acid groups e.g. in one of the positions 4, 5, 6, 7 or 8; in the positions 3,6 or 6,8 or 3, 6, 8;

Bearing sulfonic acid groups e.g. in one of the positions 4 or 5; in the positions 3,6 or 4,6 or 4,7 or 3,8 or 3,6,8 or 4,6,8;

the radicals coupled in ortho-position to the hydroxy group of 1-hydroxy-8-aminonaphthalene-5-sulfonic acid or -5,7- or -3,6- or 3,5-disulfonic acid or 1-hydroxy-6- or -7-aminonaphthalene-3-sulfonic acid and their derivatives acylated, alkylated or arylated in the amino group;

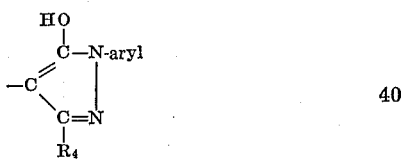

$R_4$ being $CH_3$, COOH, —CO—$NH_2$ or COO-lower alkyl and aryl being a phenyl radical optionally substituted by halogen, e.g. chlorine, lower alkyl, e.g. methyl, or especially one to two sulfonic acid groups in one of the positions 2, 3 or 4 or in the positions 2, 4 or 2, 5 and α- or β-naphthyl radical preferably substituted by one to two sulfonic acid groups;

further

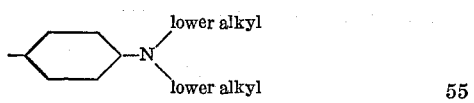

Wherein the benzene nucleus may be substituted by $CH_3$, $CH_3O$, $C_2H_5O$ or $CH_3CONH$ and alkyl may also be substituted;

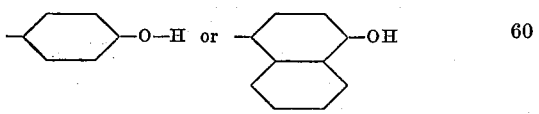

In which the hydroxy group is preferably alkylated after the coupling reaction, e.g. by means of dimethyl or diethyl sulfate or acylated, e.g. by means of methane- or ethane-sulfonic acid chloride or benzene- or para-toluene-sulfonic acid chloride;

II. In the case of disazo dyestuffs, e.g. by replacing aryl in the Formulae II to VI by a monoazo compound such as

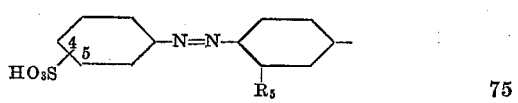

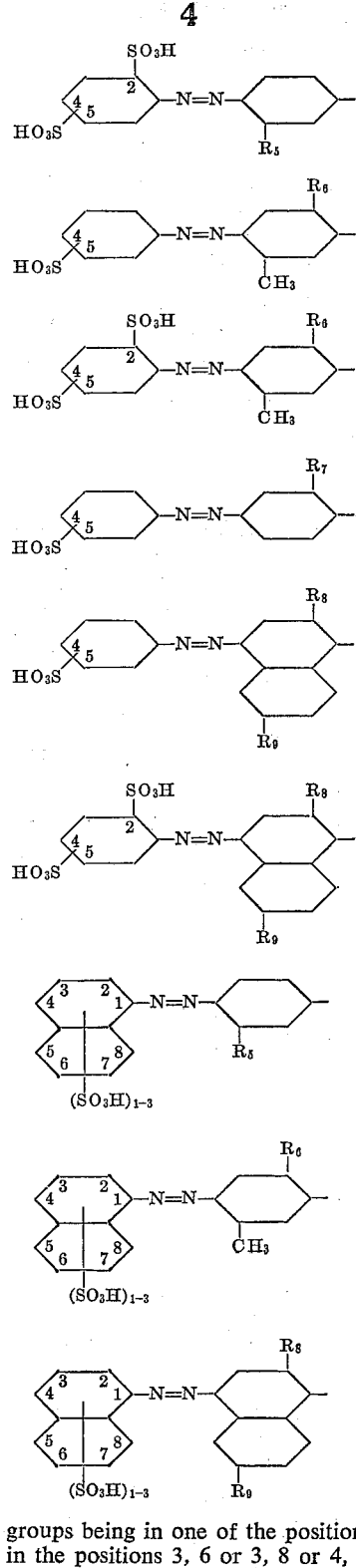

The $SO_3H$ groups being in one of the positions 4, 5, 6, 7 or 8; or in the positions 3, 6 or 3, 8 or 4, 8 or 3, 6, 8 or 4, 6, 8 of the 1-naphthyl radicals;

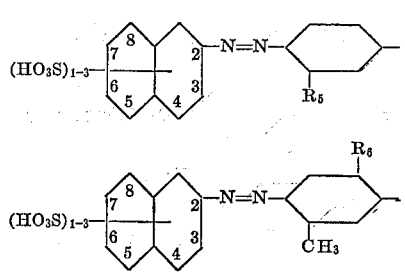

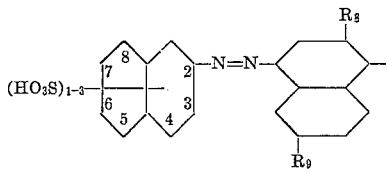

the SO₃H groups being in one of the positions 5, 6, 7 or 8 or in the positions 3, 6 or 4, 8 or 5, 7 or 6, 8 or 3, 6, 8 or 4, 6, 8 of the 2-naphthyl radicals wherein $R_5$ represents hydrogen, lower alkyl, e.g. methyl, or lower alkanoylamino, e.g. acetylamino, $R_6$ represents lower alkyl, e.g. methyl, or lower alkoxy, e.g. methoxy, $R_7$ represents —COOH or —SO₃H, $R_8$ represents hydrogen or lower alkoxy, e.g. methoxy or ethoxy, $R_9$ represents hydrogen or —SO₃H;

or

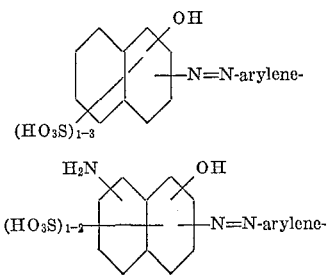

wherein arylene represents a phenylene, diphenylene or stilbene radical which may be further substituted especially by one or two SO₃H groups and the amino group in the naphthalene nucleus may be alkylated or phenylated.

III. In the case of trisazo dyestuffs

Dihalopyrimidyl-X-benzene-azo-benzene-azo-naphthalene-azo-naphthalene or

Dihalopyrimidyl-X-benzene-azo-naphthalene-azo-naphthalene-azo-benzene or

Dihalopyrimidyl-X-naphthalene-azo-benzene-azo-naphthalene-azo-naphthalene in which -X- represents —O—,

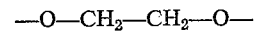
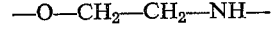

or

and the whole molecule contains at least two and preferably three to five sulfonic acid groups.

The process for the production of the new pyrimidine dyestuffs consists in reacting 1 mole of a compound of the general formula $$D_1—(OH)_n \quad (X)$$

wherein $D_1$ stands for the radical of a water-soluble organic azo dyestuff or an organic compound containing at least one substituent capable of azo dyestuff formation and $n$ stands for one of the integers 1 and 2, and wherein —OH is attached to an aromatic radical or an aliphatic bridge member of the radical $D_1$, with $n$ moles of a 2.4.6-trihalopyrimidine, preferably 2.4.6-trichloropyrimidine, and, when the reaction products are not themselves dyestuffs but contain radicals of organic compounds with a substituent capable of dyestuff formation, converting the products into water-soluble dyestuffs by a coupling reaction.

The process as herein defined can be carried out by employing as starting products compounds in which the radical $D_1$ of Formula X has dyestuff character. A second mode of operation of the process consists in starting from a compound capable of azo dyestuff formation and converting the product of the reaction with 2.4.6-trihalopyrimidine by a coupling reaction into the dyestuff. The products of the reaction with 2.4.6-trihalopyrimidine can be, e.g., amines, diamines or compounds which contain at least one substituent convertible into diazo or tetrazo compounds. They can also be coupling components from which azo dyestuffs are formed by the known methods. Both the diazo component and the coupling component can contain as a matter of course dihalopyrimidyl radicals. The dyestuffs and intermediate products used may of course contain a number of OH groups higher than the number $n$, which do not participate in the reaction with the 2.4.6-trihalopyrimidine.

The new dyestuffs can contain dihalopyrimidyl radicals attached to an optionally substituted —NH-bridge in addition to dihalopyrimidyl radicals attached to an oxygen atom. The aromatic nuclei or the aliphatic bridge members which bear the hydroxyl groups in Formula X can be directly bound to the dyestuff molecule, or indirectly through another bridge member. Representative examples of the latter are —SO₂—, —CO—, —O—, —S—,

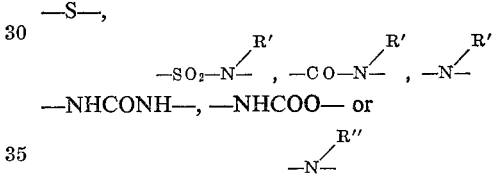

—NHCONH—, —NHCOO— or $$-N\diagup^{R''}$$

in which R' stands for hydrogen, low molecular alkyl, hydroxyalkyl, cycloalkyl, aryl or aralkyl, and R" stands for an acyl radical.

The reaction of the compounds or water-soluble dyestuffs used as starting products with 2.4.6-trihalopyrimidine is carried out preferably in aqueous medium. It can also be conducted in organic solvents or in mixtures of organic solvents and water; such media can be particularly effective for reacting poorly soluble or insoluble intermediate products. The choice of organic solvents includes alcohols, acetone, benzene, toluene, tertiary organic bases such as pyridine, etc. The 2.4.6-trihalopyrimidines can be employed as such in concentrated form or in solution in an organic solvent. Solvents especially suitable for 2.4.6-trihalopyrimidines are acetone, benzene, chlorobenzene and toluene.

The reaction temperature is adapted to the reactivity of the individual starting products and varies within wide limits. Preferably, temperatures between 0° and 100° C. are employed. If temperatures higher than about 40° C. must be maintained it is advisable in view of the volatility of the trihalopyrimidines in steam to work in vessels fitted with reflux condensers.

The reaction is carried out in a strongly to weakly alkaline, neutral or weakly acid medium. To neutralize the hydrogen halide formed an acid-binding agent, e.g., sodium or potassium carbonate, sodium hydroxide, potassium hydroxide, calcium hydroxide or barium hydroxide in solid powder form or as an aqueous solution is added to the solution either at the start or in the course of the reaction. The addition of small amounts of a wetting or emulsifying agent to the reaction mixture can accelerate the rate of reaction.

In both modes of operation of the process the reaction is effected preferably with equivalent amounts of reactants so that only one halogen atom of the 2.4.6-trihalopyrimidine reacts with an exchangeable hydrogen atom of the hydroxy group.

On completion of condensation or coupling the final dyestuff is salted out from the previously neutralized solution or suspension with sodium or potassium chloride or precipitated with an acid, and subsequently filtered off, washed and dried.

The water-soluble dyestuffs produced in accordance with the present process, which contain at least one dihalopyrimidyl ring, are suitable for dyeing, padding and printing fibers of vegetable and animal origin, fibers of regenerated cellulose, casein fibers, animalized cellulosic fibers, synthetic fibers, mixtures of these fibers, and leather. The dyeings are subjected when necessary to alkaline aftertreatment at moderate or high temperatures followed by soaping. They possess good fastness to light, water, sea water, washing, milling, rubbing, perspiration and gas fumes and show a very good reserve of acetate and triacetate rayon, polyacrylonitrile, polyester, e.g., polyethylene terephthalate, polyvinyl chloride and polyvinyl acetate fibers, polyethylene and polypropylene fibers. The new dyestuffs are also highly suitable for application by continuous and semi-continuous processes such as the Pad-Jig, Pad-Roll and Pad-Steam methods, and are fully resistant to heat-setting treatments.

The dyeings and prints produced with the new dyestuffs are of high quality, due primarily to the fact that the dyestuff enters into chemical combination with the substrate to form a stable chemical linkage and hence is as a rule extremely fast to wet treatments. If the total amount of applied dyestuff does not take part in the chemical reaction with the substrate, the unreacted proportion is removed by suitable aftertreatments such as washing and/or soaping, if necessary at high temperatures, for which purpose synthetic detergents can be used in addition to the normal washing agents, e.g., alkylarylsulfonates, sodium lauryl sulfate, optionally sulfated or carboxymethylated alkylpolyglycol and mono- and dialkylphenyl-polyglycol ethers.

In dyeing, padding and printing applications the dyestuffs can be fixed simultaneously or subsequently, in the same or in a fresh bath, if necessary after intermediate drying. When fixation is carried out in a fresh bath it is advisable to include in it a water-soluble salt, e.g. sodium sulfate, to preclude a partial redissolving of the dyestuff in the liquor. The dyestuff radical is fixed on the fiber by heat treatment, i.e. under the conditions of heat setting.

The new dyestuffs with a dihalopyrimidyloxy group react more easily with polyamide fibers, e.g. wool, or cellulosic fibers, e.g. cotton, linen or regenerated cellulose, than the corresponding dyestuffs with a dihalopyrimidylamino group so that a greater amount of dyestuff remains fixed on the fiber even after the dyeing has been treated with pyridine (so-called pyridine test) or with a hot solution of a detergent.

The fixation process can, however, be markedly accelerated or the necessary fixation temperature reduced by adding to the dyebath or the aftertreating bath an agent of acid or alkaline reaction as catalyst.

The optimum conditions for laboratory-scale application of the dyestuffs vary widely depending on the type of fiber to be dyed. In the case of animal fibers and synthetic polyamide fibers it is preferable to dye, pad or print, or alternatively to fix, in an acid, neutral or weakly alkaline medium, e.g. in presence of acetic acid, formic acid, sulfuric acid, ammonium sulfate, lactic acid, oxalic acid, sodium acetate, sodium bicarbonate, sodium or potassium carbonate, sodium meta-phosphate, trimethylamine, pyridine, quinoline, etc. Dyeing can also be carried out in an acetic acid to neutral bath in presence of levelling agents, e.g. polyoxethylated fatty amines or mixtures of the same with alkylpolyglycol ethers, the dyebath being adjusted on completion of dyeing to a neutral or weakly alkaline reaction, using for this purpose small amounts of an agent of alkaline reaction, e.g. ammonia, sodium bicarbonate or carbonate, etc., or compounds which react alkaline on heating, e.g. hexamethylenetetramine or urea. The dyed goods are then thoroughly washed and if necessary acidified with a little acetic acid.

Cellulosic fibers are dyed, padded and printed preferably from alkaline media, e.g. in presence of sodium bicarbonate, sodium carbonate, sodium hydroxide, potassium hydroxide, calcium hydroxide, sodium meta-silicate, sodium borate, water glass, trisodium phosphate, ammonia, trimethylamine, quaternary bases, e.g. tetraalkylammonium compounds, etc. To prevent reduction reactions during dyeing, padding or printing, it is often advantageous to use a mild oxidizing agent, e.g. sodium 1-nitrobenzene-3-sulfonate. Dyeings on cellulosic fibers are normally fixed by treatment in heat. Provided sufficiently strong alkalis such as sodium or potassium hydroxide or trisodium phosphate are used, a number of the dyestuffs can be applied by cold dyeing methods. After fixation the dyed, padded or printed material is thoroughly washed and soaped to remove the unfixed proportion of dyestuff.

In the following examples the parts and the percentages are by weight and the temperatures in degrees centigrade.

EXAMPLE 1

100 parts of the dyestuff (as the sodium salt) obtained by coupling diazotized 2-aminonaphthalene-4.8-disulfonic acid with hydroxybenzene in alkaline medium, are dissolved in 2500 parts of water with vigorous stirring. At 70–75° are added in the course of 30–40 minutes 50 parts of 2.4.6-trichloropyrimidine, and by simultaneous dropwise addition of approximately 100 parts of a 10% sodium hydroxide solution the pH value is maintained between 7.0 and 7.5. As soon as no more starting dyestuff is present, the temperature is allowed to fall to 40° and the solution is filtered free of minor impurities. The filtrate is mixed with 300 parts of sodium chloride with agitation and the precipitated dyestuff is then filtered off, washed with 10% sodium chloride solution and dried in vacuo at 50°. A yellow-brown powder is obtained which dissolves in water with a yellow coloration.

2 parts of the dried dyestuff are dissolved in 4000 parts of water. The solution is heated to 40° and 2 parts of 100% acetic acid are added. 100 parts of a wool fabric are introduced into this bath, which is then brought to the boil in 15–20 minutes and maintained at boiling temperature for 45–60 minutes. After cooling to 85–90°, about 3 parts of 25% ammonia or 3 parts of hexamethylenetetramine are added and the treatment is continued for 20 minutes at 90°. The dyed goods are subsequently rinsed with a little acetic acid added to one of the rinsing waters, and then dried. The wool is dyed in a level, reddish yellow shade of very good fastness to washing, perspiration and milling and good light fastness.

EXAMPLE 2

25.6 parts of the sodium salt of the monoazo dyestuff produced by coupling diazotized 1-amino-4-(2'-hydroxy)-ethoxybenzene with 1-hydroxynaphthalene-3.6-disulfonic acid in alkaline medium are dissolved with stirring in 200 parts of water at 60–65°. On cooling to 50°, 50 parts of 30% sodium hydroxide solution are added followed by 250 parts of ice to bring the temperature to 0°. To this solution, which reacts alkaline to Thiazole Yellow, are added 9 parts of 2.4.6-trichloropyrimidine. Stirring is kept up over the next 1–2 hours at 0–5°, then 3 parts of 2.4.6-trichloropyrimidine are added and stirring continued for about 2 more hours at the same temperature. The new dyestuff formed thus is precipitated as very fine crystals. After diluting the reaction mass with 750 parts of water, the dyestuff is salted out at about 10° by the addition of 180 parts of potassium chloride. It is filtered off with suction and washed with a 15% potassium chloride solution to eliminate the retained sodium hydroxide. Should any residual trichloropyrimidine be present, it is removed by further washing with a little acetone. If necessary the dyestuff can be purified by dissolving in water and reprecipitation. The neutral dyestuff paste is dried at 50–60° in vacuo. The new dyestuff is a red powder which dissolves in water to give scarlet solutions. A very similar dyestuff is obtained when the 12 parts of 2.4.6-trichloropyrimidine are replaced by 21 parts of 2.4.6-tribromopyrimidine and the condensation carried out in similar manner.

A fabric of viscose rayon staple fiber is printed on a roller printing machine with a paste composed of:

30 parts of the dyestuff of Example 2,
100 parts of urea,
405 parts of water,
450 parts of sodium alginate thickening 4% and
15 parts of sodium bicarbonate 1000 parts total.

The print is dried, steam for 5–10 minutes at about 102°, rinsed thoroughly in cold water, soaped at the boil for 10 minutes, rinsed with water and dried. The brilliant scarlet print shows outstanding fastness to wet treatments and very good light fastness.

Similarly good results are obtained when the print, instead of being steamed, is treated in dry heat for 5 minutes at 120–150°.

EXAMPLE 3

143.5 parts of sodium salt of the monoazo dyestuff obtained by coupling diazotized 1-amino-2-chlorobenzene-5-sulfonic acid-(2'-hydroxy)-ethylamide with 1-(2'.5'-dichloro-4'-sulfo)-phenyl-3-methyl-5-pyrazolone in alkaline medium are dissolved in 1000 parts of water with an addition of 350 parts of 30% sodium hydroxide solution. On cooling to 0–5° a solution of 69 parts of 2.4.6-trichloropyrimidine in 200 parts of chlorobenzene is added dropwise with thorough stirring.

For the next 3 hours stirring is continued at 0–5°, on which the new dyestuff is precipitated. The reaction medium is diluted with 1000 parts of water to redissolve the dyestuff. This solution is then filtered through a filter cloth at 5–10°. The filtrate is neutralized with about 100 parts of glacial acetic acid and the dyestuff salted out with 300 parts of potassium chloride. After redissolving and reprecipitation it is obtained in the pure state. It is dried in vacuo at 50–60° to give a yellow powder which readily dissolves in water with a greenish yellow coloration.

30 parts of this dyestuff, 10 parts of trisodium phosphate, 20 parts of Glauber's salt and 5 parts of sodium 1-nitro-benzene-3-sulfonate are dissolved in 1000 parts of water. This liquor is applied on a Pad-Roll dyeing machine to a viscose staple fiber fabric with a pressure giving an increase of approximately 80% on the dry weight. The padded fabric is heated in the infra-red heating zone and then passes into the conditioning or "dyeing-in" chamber, where it is conditioned in a moist atmosphere for 1–2 hours at 85–90°. On fixation of the dyestuff the material is washed well with water, soaped at the boil for 10 minutes, washed again and dried. The procedure gives a brilliant greenish yellow dyeing which shows outstanding wet fastness properties and very good light fastness. When in place of trisodium phosphate 20 parts of sodium bicarbonate are used and a correspondingly longer time is allowed for conditioning, e.g. 5–6 hours, comparably good results are obtained.

EXAMPLE 4

71.2 parts of the disazo dyestuff which is produced by coupling tetrazotized 4.4'-diamino-5,5'-dimethyl-1.1'-diphenyl-2.2'-disulfonic acid with 1-hydroxynaphthalene-4-sulfonic acid on the one hand and hydroxybenzene on the other, are dissolved in 500 parts of water at 90°. At a pH value of 6.0 and a temperature of 90° are added 18.3 parts of 2.4.6-trichloropyrimidine, a constant pH value of 6.0–6.5 being maintained by dropping in a dilute sodium carbonate solution. The endpoint of the reaction of the phenolic hydroxy group with the trichloropyrimidine can be easily detected by chromatography on a talc column or on paper. When the reaction solution has cooled, the dyestuff is precipitated with common salt, purified if necessary by redissolving and reprecipitation, and then dried. It is obtained as a red powder which dyes wool, silk and cellulosic fibers in scarlet shades which have very good wet fastness properties.

EXAMPLE 5

35.8 parts of 1-N-ethyl-N-(2'-hydroxy)-ethylamino-3-methylbenzene are vigorously stirred into 300 parts of water. 30 parts of a 30% sodium hydroxide solution are added and after cooling to 0–5° a solution of 40 parts of 2.4.6-trichloropyrimidine in 100 parts of acetone is run in. The mass is then stirred for 2–3 hours at 0–5°. The reaction product soon begins to be precipitated in solid form. On completion of the reaction 100 parts of acetone are added to the mass and the precipitated reaction product is separated from the mother liquor by filtration. It is washed with a little ethyl alcohol to remove the residual trichloropyrimidine.

The dichloropyrimidyl derivative thus obtained is converted into the dyestuff by stirring 60.4 parts of 2-amino-naphthalene-4.8-disulfonic acid in 300 parts of water and dissolving by an addition of about 24 parts of 30% sodium hydroxide solution. 50 parts of 30% hydrochloric acid are run in at 0–5° with thorough stirring, followed over the next 15–30 minutes at the same temperature by 13.8 parts of sodium nitrite in small portions. The diazo compound formed goes into solution. After the addition of the sodium nitrite stirring is continued for 30 minutes and any excess of nitrous acid is destroyed by the addition of some aminosulfonic acid. Meanwhile 65 parts of the dichloropyrimidyl derivative are stirred into 1000 parts of water and dissolved by the addition of about 20 parts of glacial acetic acid. This solution is added at 0–10° to the diazo solution and the whole is adjusted to a pH of about 4.0–5.0 with sodium acetate in the course of 30–60 minutes. Coupling takes place very quickly. The coupling solution is stirred for 3–5 hours at 10° and a pH value of 4.0–5.0 is maintained by the addition of small amounts of sodium carbonate. After neutralization the dyestuff is precipitated with 150 parts of sodium chloride, filtered off, washed with water and a little alcohol, and dried in vacuo at 50–60°. The new pyrimidine dyestuff is a dark brown powder and dissolves in neutral medium with an orange-yellow coloration.

100 parts of cotton sateen are padded at room temperature in 1000 parts of a 3% neutral solution of the dyestuff obtained as described above, and squeezed to give an increase of 100% to 150% on the dry weight. After drying it is treated in an open jigger in a developing bath containing 10 grams per liter of sodium carbonate and 240 grams per liter of Glauber's salt for 15–30 minutes at 80–90°. The fabric is subsequently rinsed well with cold water, soaped for 10 minutes at the boil in a bath containing 3 grams per liter of soap and 2 grams per liter of sodium carbonate, rinsed again with water and dried. The orange-brown dyeing produced in this way is outstandingly fast to wet treatments and has good light fastness.

When in this example 69 parts of 2.4.6-tribromopyrimidine are used in place of 40 parts of 2.4.6-trichloropyrimidine, a dyestuff with very similar properties is obtained.

EXAMPLE 6

30.6 parts of 1-(2'-hydroxy-ethoxy)-4-aminobenzene are vigorously stirred into 300 parts of water. 30 parts of a 30% sodium hydroxide solution are added and after cooling to 0–5° a solution of 40 parts of 2.4.6-trichloropyrimidine in 100 parts of acetone is run in. The mass is then stirred for 4–6 hours at the same temperature.

After neutralizing the solution the condensation product is filtered off and washed with cold water.

The dichloropyrimidyl derivative thus obtained is diazotized by suspending in 500 parts of water and by adding 50 parts of 30% hydrochloric acid, followed by 14 parts of sodium nitrite added in small portions over about the next 30 minutes at a temperature of 0–5°. When the diazotization is finished the excess of nitrous acid is destroyed by the addition of some amino-sulfonic acid. Meanwhile 76.8 parts of 1-hydroxynaphthalene-3.6.8-trisulfonic acid are dissolved as the sodium salt in 1000 parts of water. 100 parts of sodium carbonate are added and the resulting solution is cooled to 5–10°. Afterwards the above-obtained diazo compound is added with thorough stirring. The coupling reaction takes place immediately. The resulting ruby dye solution is neutralized and the new dye precipitated by the addition of about 200 parts of sodium chloride, filtered off, washed with cold water and dried in vacuo at 50–60°. The new pyrimidine dye is a dark red powder and dissolves in water with a brilliant ruby coloration.

Fixed on cotton sateen by the padding method described in Example 5, the new dye gives clear ruby dyeings of outstanding wet fastness properties and excellent light fastness.

The formulae of the foregoing Examples 1 to 6 are as follows:

*Example 1*

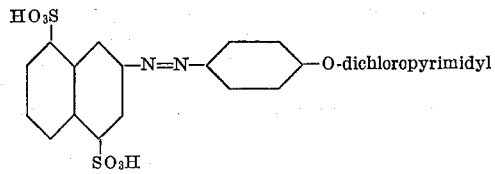

dichloropyrimidyl denotes 2.6-dichloro-pyrimidyl-4 or 4.6-dichloropyrimidyl-2, the dye itself being a mixture of the two isomers.

*Example 2*

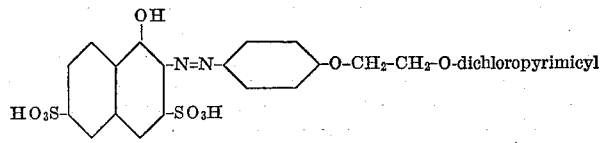

*Example 3*

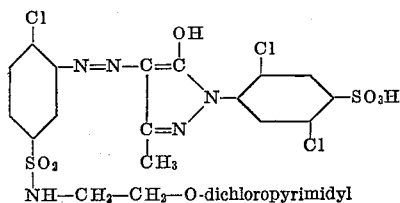

*Example 4*

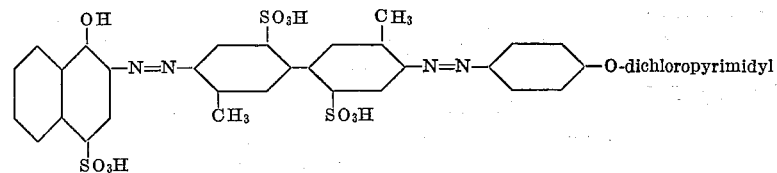

*Example 5*

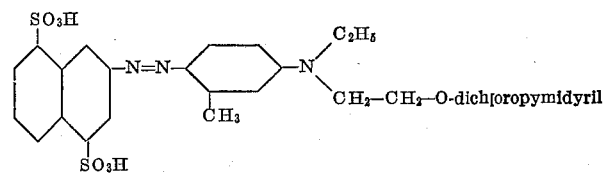

*Example 6*

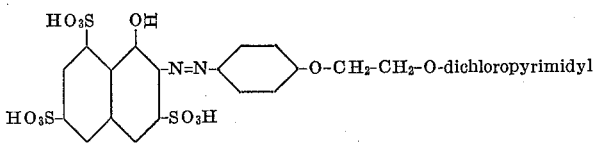

In the following table further water-soluble pyrimidine dyestuffs which were obtained by the processes described in Examples 1 to 5 are represented by their formulae. A denotes a dichloropyrimidyl radical of the formula

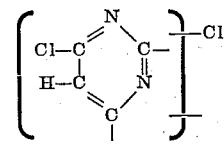

I.e. a mixture of 2,6-dichloropyrimidyl-4- and 4.6-dichloropyrimidyl-2 and B denotes a dibromopyrimidyl radical of the formula

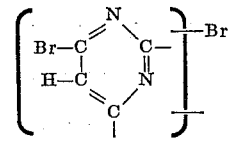

I.e. a mixture of 2.6-dibromopyrimidyl-4- and 4.6-dibromopyrimidyl-2

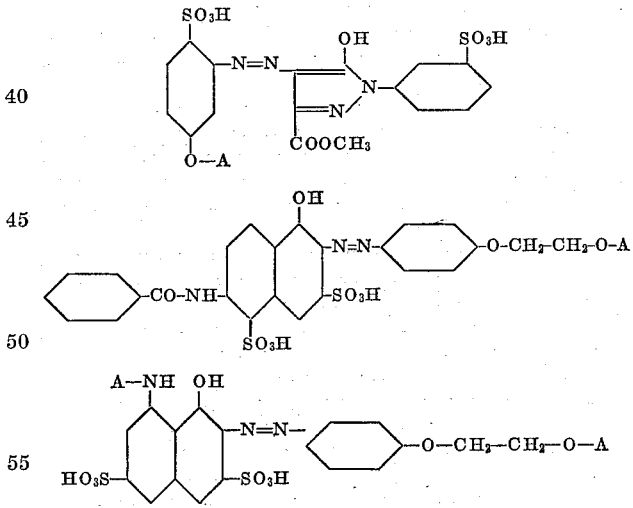

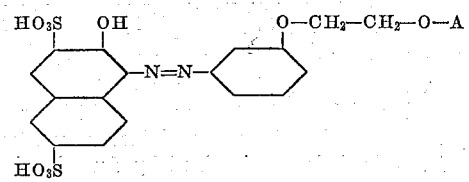

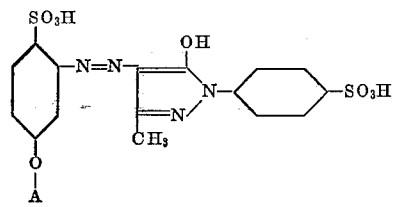
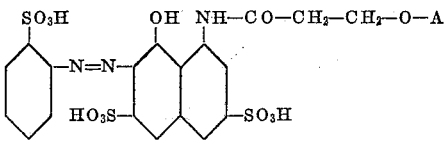
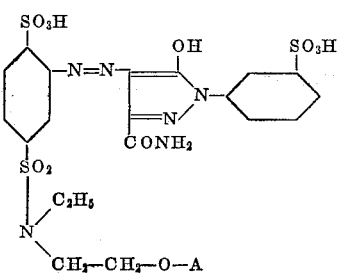
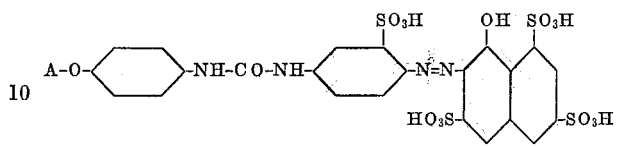
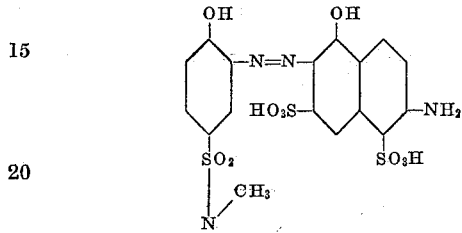
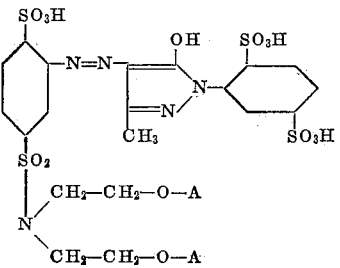
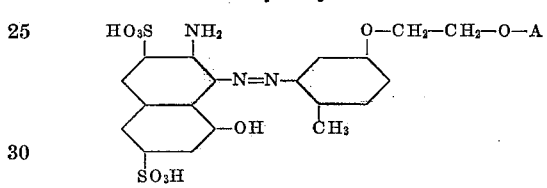
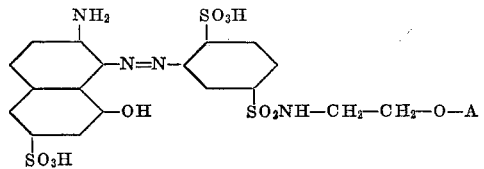
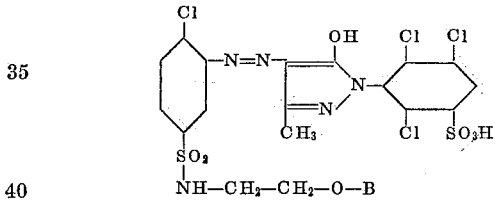
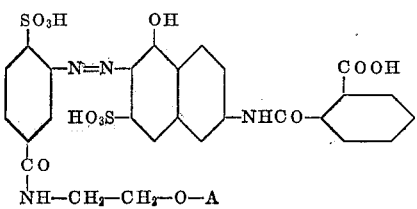
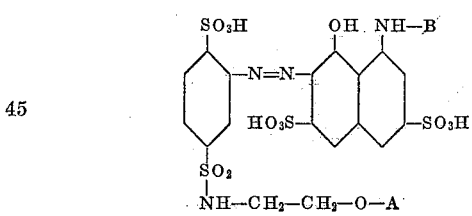
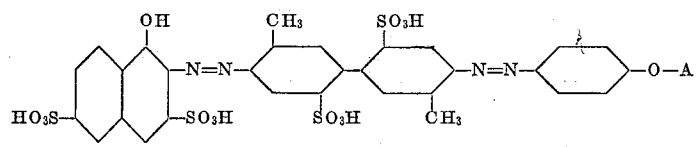
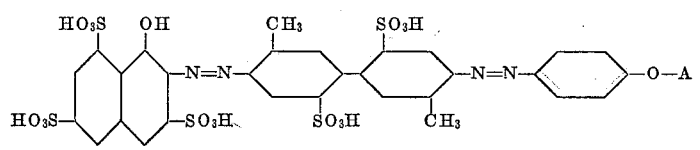
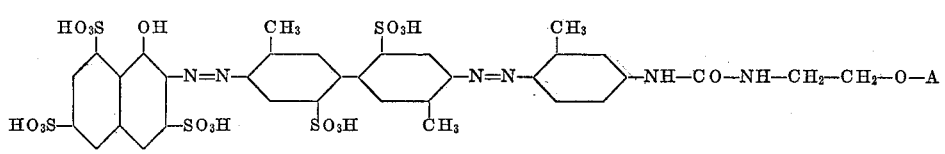
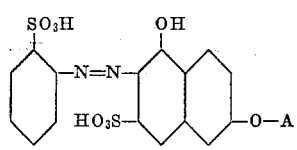
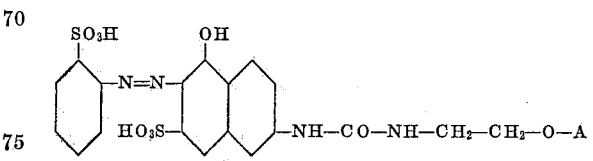

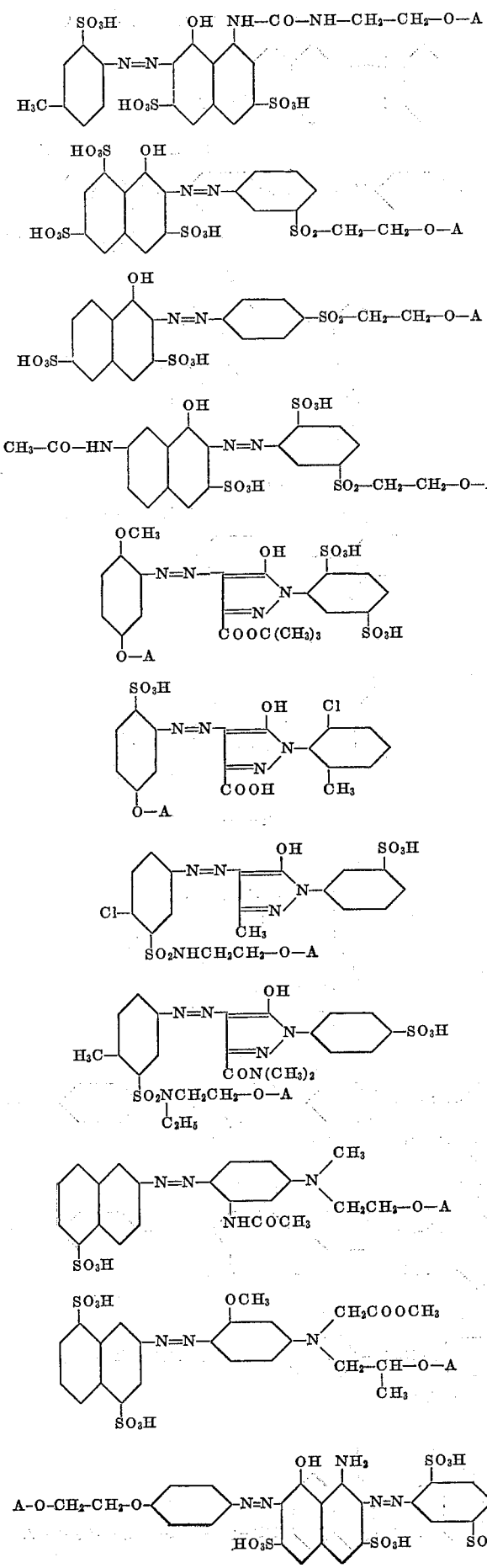
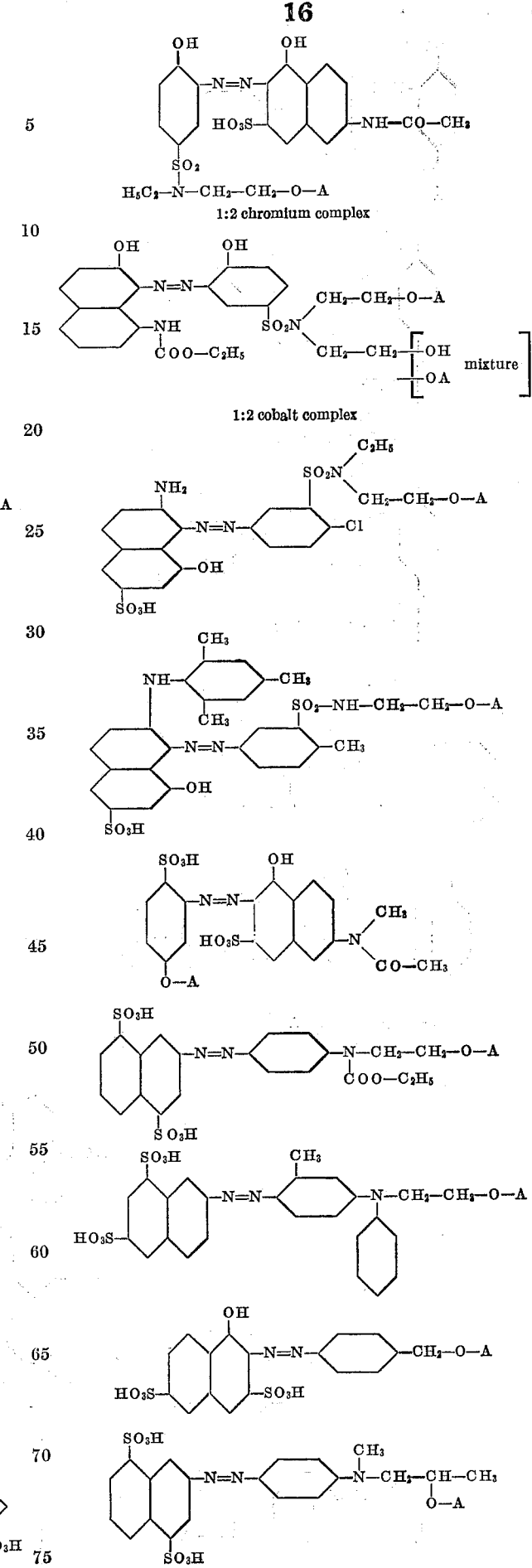

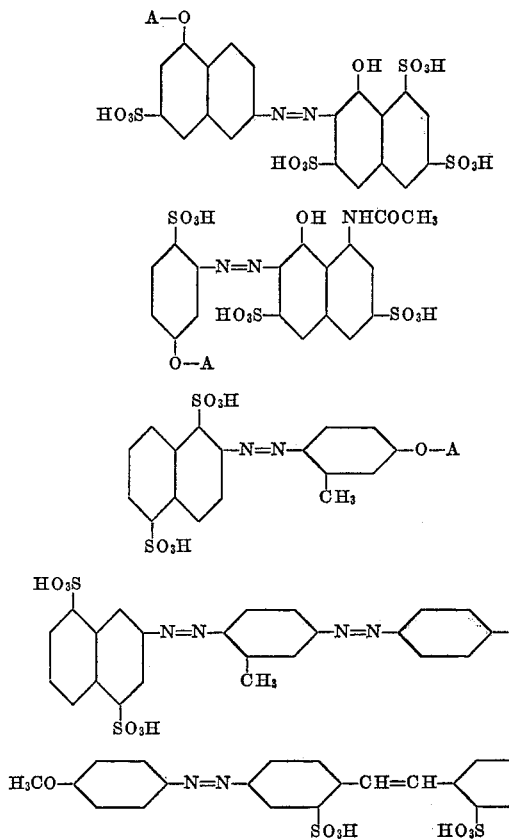
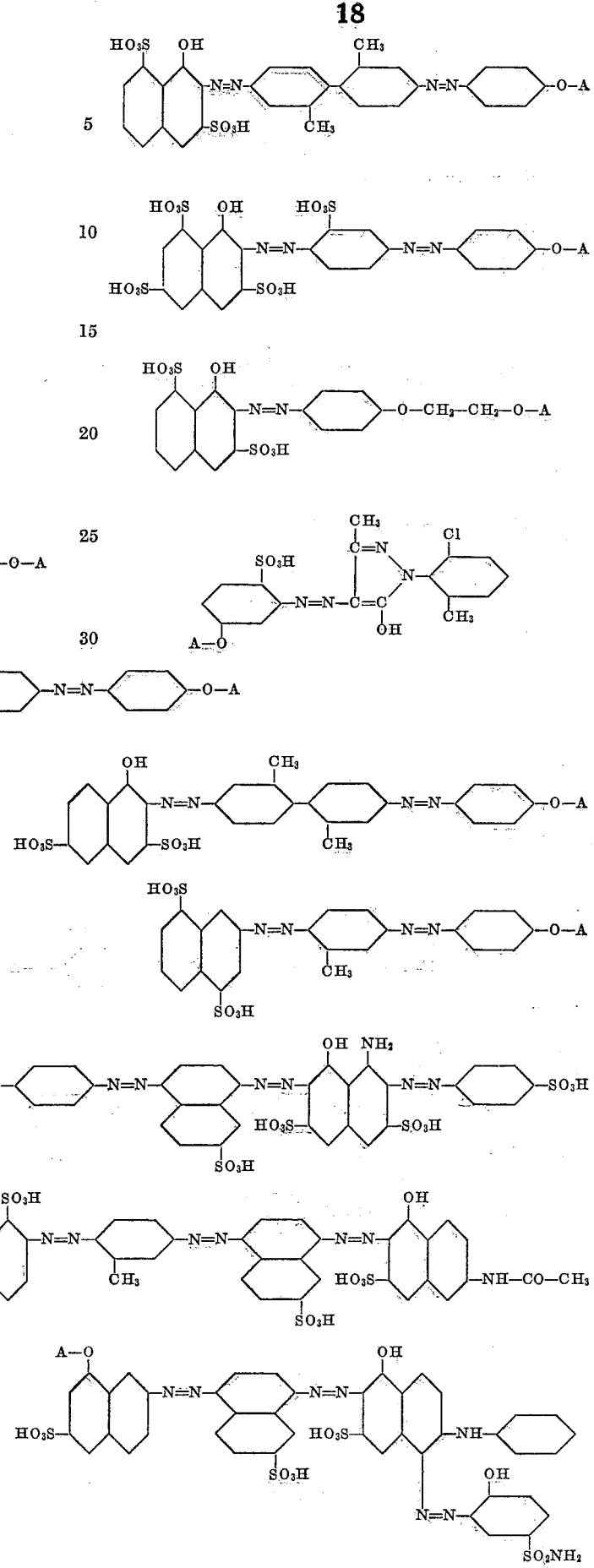

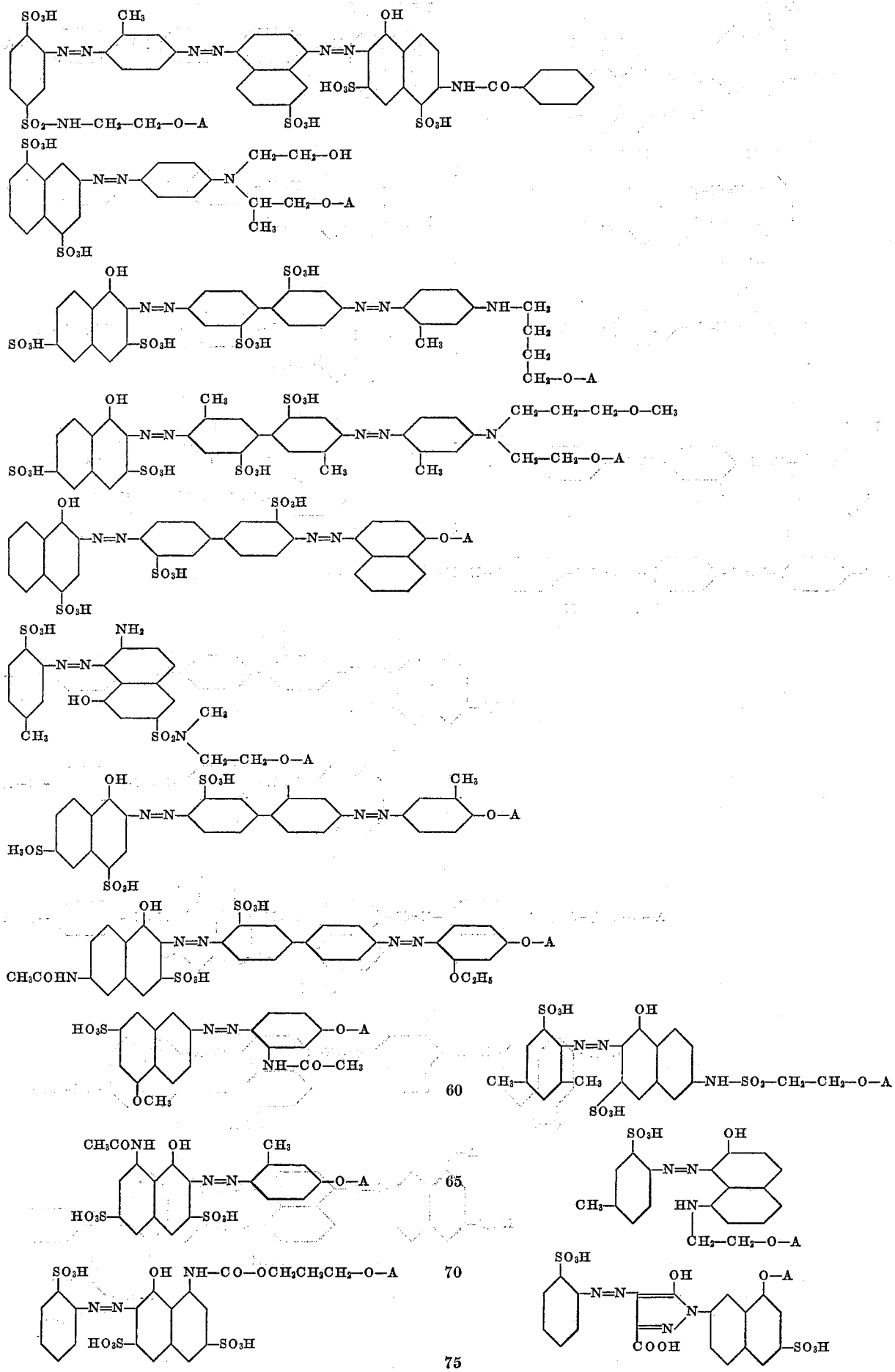

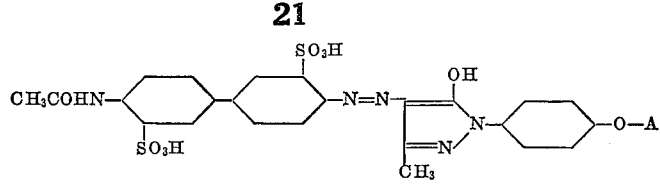

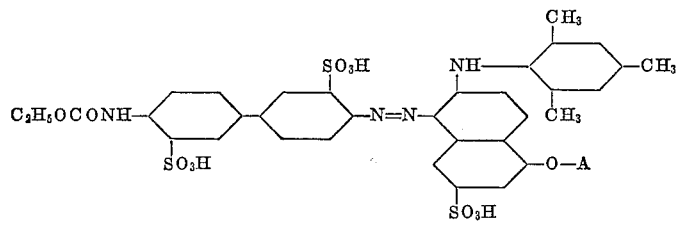

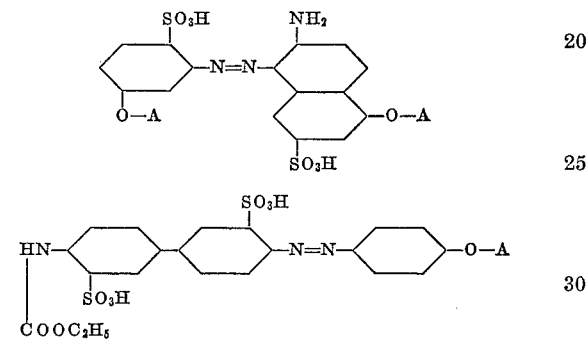

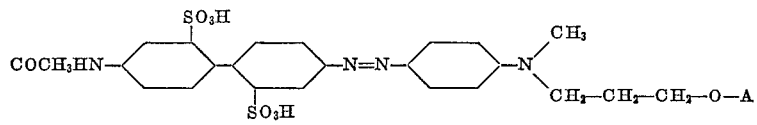

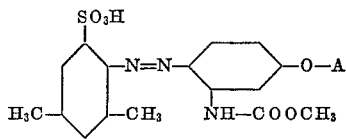

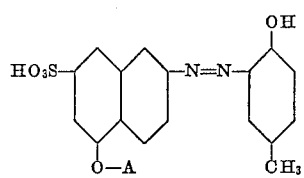

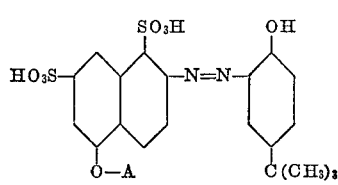

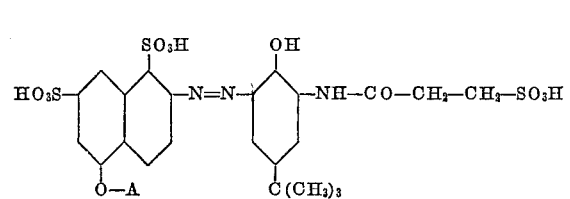

SHADE OF THE AQUEOUS SOLUTIONS

| No. of Example | Shade | No. of Example | Shade |
|---|---|---|---|
| 7 | Yellow. | 46 | Brown-orange. |
| 8 | Blue-red. | 47 | Scarlet. |
| 9 | Red-violet. | 48 | Brilliant red. |
| 10 | Orange. | 49 | Yellow. |
| 11 | Yellow. | 50 | Do. |
| 12 | Reddish yellow. | 51 | Do. |
| 13 | Yellow. | 52 | Yellowish red. |
| 14 | Red. | 53 | Bluish red. |
| 15 | Orange. | 54 | Yellowish red. |
| 16 | Do. | 55 | Greenish yellow. |
| 17 | Red. | 56 | Yellowish red. |
| 18 | Blue-red. | 57 | Yellow. |
| 19 | Violet-copper complex: bordeaux. | 58 | Gray. |
| 20 | Red. | 59 | Blue-gray. |
| 21 | Greenish yellow. | 60 | Coppered: gray. |
| 22 | Red. | 61 | Blue-gray. |
| 23 | Scarlet. | 62 | Brown. |
| 24 | Yellowish red. | 63 | Scarlet. |
| 25 | Do. | 64 | Do. |
| 26 | Orange. | 65 | Red. |
| 27 | Red. | 66 | Bluish red. |
| 28 | Do. | 67 | Red. |
| 29 | Do. | 68 | Bluish red. |
| 30 | Yellow. | 69 | Brown-yellow. |
| 31 | Do. | 70 | Brown. |
| 32 | Do. | 71 | Red. |
| 33 | Do. | 72 | Orange. |
| 34 | Do. | 73 | Brown. |
| 35 | Brown-orange. | 74 | Yellow. |
| 36 | Brown. | 75 | Do. |
| 37 | Gray-violet. | 76 | Bluish red. |
| 38 | Do. | 77 | Orange-red. |
| 39 | Do. | 78 | Yellow-brown. |
| 40 | Bluish red. | 79 | Brown. |
| 41 | Bordeaux. | 80 | Yellow-brown. |
| 42 | Scarlet. | 81 | Orange. |
| 43 | Reddish yellow. | 82 | Do. |
| 44 | Brown-orange. | 83 | Do. |
| 45 | Yellow-red. | 84 | Do. |
|  |  | 85 | Yellow. |

EXAMPLE 86

A dyebath is prepared with 2 parts of the dyestuff of Example 6, 1500 parts of sodium chloride. 100 parts of cotton sateen are introduced into the bath at room temperature and dyed at 20–25° for 30–45 minutes, during which time a further 100–150 parts of sodium chloride are added to the dyebath in portions. Subsequently 3–5 parts of sodium hydroxide are added and dyeing continued for 30–45 minutes at the same temperature. The dyed goods are then rinsed with cold water, soaped at the boil for 10–20 minutes, rinsed again and dried. A brilliant red dyeing is obtained which is outstandingly fast to wet treatments and of good light fastness.

EXAMPLE 87

30 parts of the dyestuff of Example 2 are dissolved in 1000 parts of water. A fabric of viscose rayon staple fiber is padded with this liquor and squeezed to give an increase of 70% on the dry weight. After drying in a festoon drier, the padded fabric is treated on the jig for 1 hour in a bath at 20–30° containing, per 1000 parts of water, 300 parts of anhydrous sodium sulfate and 20–30 parts of trisodium phosphate or 5–10 parts of sodium hydroxide. The fabric is next rinsed in a cold water bath with overflow, then again rinsed for 10 minutes at 90–95°, if necessary soaped in a fresh bath at the boil, and finally rinsed. On drying, a brilliant yellowish red dyeing is obtained which has very good wet fastness properties and good light fastness.

EXAMPLE 88

A dyebath is prepared with 3000 parts of soft water and 1.5 parts of dyestuff No. 51 of the dyestuff table. 100 parts of wetted-out viscose staple fiber fabric are entered at 70° and dyed for 15 minutes at 70–75°; then 3 parts of calcined sodium sulfate are added and dyeing continued for 30 minutes at the same temperature. 20 parts of calcined sodium carbonate are added and the dyed goods treated in the alkaline bath for 15 minutes at 70–75°. The dyeing thus obtained is well rinsed with hot water, soaped at the boil for 20 minutes in two separate baths, each containing 3 g./l soap, then again well rinsed, and finally dried.

The dyeing is yellow in shade and has good wet fastness properties.

EXAMPLE 89

100 parts of wool are dyed in 5000 parts of a dyebath containing 2 parts of dyestuff No. 56 of the dyestuff table and 2 parts of glacial acetic acid. Dyeing is started at 50°, the bath then being brought to 98° in 30 minutes and maintained at this temperature for 45 minutes. A yellowish red dyeing is obtained which has good wet fastness properties due to the fact that the greater part of the exhausted dyestuff has entered into chemical combination with the wool fiber.

Having thus disclosed the invention what we claim is:

1. Water-soluble azo dyestuffs of the formula (dihalopyrimidyl-X)$_n$ (water-soluble azo dyestuff radical)

wherein each halogen of the dihalopyrimidyl has an atomic number from 17 to 35 inclusive; the water-soluble azo dyestuff radical contains a maximum of three —N=N— groups; X is an —O— containing bridge, the —O— being directly bonded to a ring carbon atom of the dihalopyrimidyl group in one of the positions 2, 4 and 6 and being also bonded to the azo dyestuff radical; $n$ is a whole positive number of at most 2; and the X bridge being selected from the group consisting of —O—,
—O-(lower alkylene)-O—,
—O-(lower alkylene)-NH—,
—O-(lower alkylene)-aminocarbonyl-,
—O-(lower alkanoylamino)-,
—O-(lower alkylene)-NH—CO—NH, —O-(lower alkylene)-N(lower alkyl), —O-(lower alkylene)-N(phenyl), —O-(lower alkylene)-N(COO-(lower alkyl)), —O-(lower alkylene)-SO$_2$—,
—O-(lower alkylene)-NH—SO$_2$—, —O-(lower alkylene)-N-SO$_2$-(lower alkyl), —O-(lower alkylene)-N-SO$_2$-(lower alkylene)-O—, —O-phenylaminosulfonyl- and
—O-phenyl-ureido.

2. Water-soluble azo dyestuff according to claim 1, wherein the dihalopyrimidyl-X moiety is of the formula $$\left[ \text{Hal-C} \begin{array}{c} N=C \\ \diagdown \\ C-C \\ | \\ H \end{array} \begin{array}{c} N \\ \diagup \end{array} \right] \begin{array}{c} -X- \\ \\ -\text{Hal} \end{array}$$

the azo dyestuff radical contains an —N=N-benzene nucleus; and the X bridge being directly bonded to the latter in one of the meta and para positions to said —N=N—.

3. Water-soluble azo dyestuff according to claim 1, wherein the dihalopyrimidyl-X moiety is of the formula $$\left[ \text{Hal-C} \begin{array}{c} N=C \\ \diagdown \\ C=C \\ | \\ H \end{array} \begin{array}{c} N \\ \diagup \end{array} \right] \begin{array}{c} -X- \\ \\ -\text{Hal} \end{array}$$

the azo dyestuff radical contains an —N=N-naphthalene nucleus; and the X bridge being directly bonded to the latter in one of the meta and para positions to said —N=N—.

4. The water-soluble monoazo dyestuff which corresponds to the formula

[structure: phenyl with SO$_3$H, —N=N—C=C(OH)—N(phenyl-SO$_3$H)—C=N—CH$_3$, with dichloropyrimidyl]

5. The water-soluble monoazo dyestuff which corresponds to the formula

[structure: naphthalene with NH$_2$, SO$_3$H, OH, SO$_3$H substituents, —N=N—phenyl—SO$_2$—NH—CH$_2$—CH$_2$—O-dichloropyrimidyl]

6. The water-soluble disazo dyestuff which corresponds to the formula

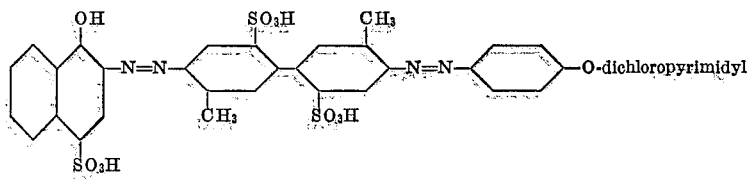

7. The water-soluble disazo which corresponds to the formula

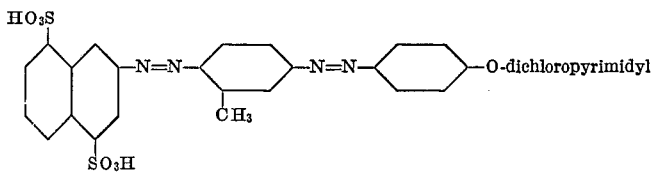

8. The water-soluble monoazo dyestuff which corresponds to the formula

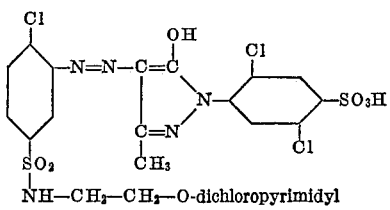

9. The water-soluble monoazo dyestuff which corresponds to the formula

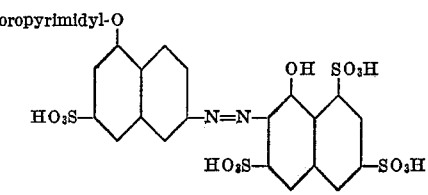

10. The water-soluble monoazo dyestuff which corresponds to the formula

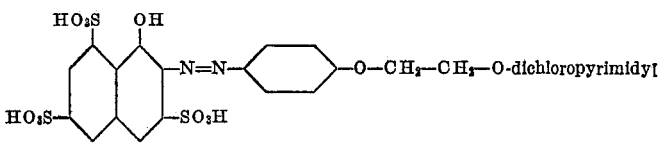

11. The water-soluble monoazo dyestuff which corresponds to the formula

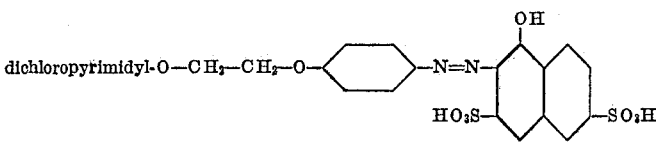

12. The water-soluble trisazo dyestuff which corresponds to the formula

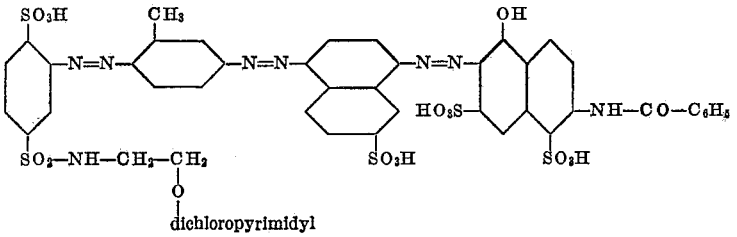

13. The water-soluble monoazo dyestuff of the formula
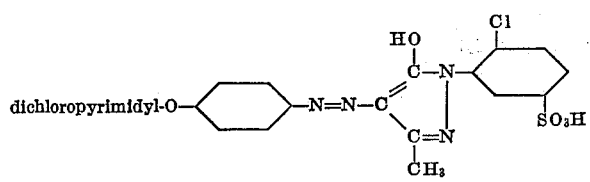
References Cited by the Examiner
UNITED STATES PATENTS
| | | | |
|---|---|---|---|
| 223,019 | 12/1899 | Vaughan | 8—1 |
| 1,667,312 | 4/1928 | Fritzsche et al. | 260—153 |
| 1,886,480 | 11/1932 | Haller et al. | 260—153 |
| 2,232,892 | 2/1941 | Klenck | 8—1 |
| 2,665,273 | 1/1954 | Mast et al. | 260—154 |
| 2,820,785 | 1/1958 | Zollinger et al. | 260—153 |
| 2,935,506 | 5/1960 | Heslop | 260—154 |
| 2,980,665 | 4/1961 | Langley | 260—154 |
CHARLES B. PARKER, *Primary Examiner.*